United States Patent
Bier

(10) Patent No.: US 12,465,526 B2
(45) Date of Patent: Nov. 11, 2025

(54) BANDAGE IMPRINT

(71) Applicant: KOB GMBH, Wolfstein (DE)

(72) Inventor: Martin Bier, Herren-Sulzbach (DE)

(73) Assignee: KOB GMBH, Wolfstein (DE)

( * ) Notice: Subject to any disclaimer, the term of this patent is extended or adjusted under 35 U.S.C. 154(b) by 451 days.

(21) Appl. No.: 17/279,308

(22) PCT Filed: Nov. 7, 2019

(86) PCT No.: PCT/EP2019/080464
§ 371 (c)(1),
(2) Date: Mar. 24, 2021

(87) PCT Pub. No.: WO2020/094753
PCT Pub. Date: May 14, 2020

(65) Prior Publication Data
US 2021/0401626 A1    Dec. 30, 2021

(30) Foreign Application Priority Data

Nov. 9, 2018 (DE) ...................... 10 2018 128 054.8

(51) Int. Cl.
*A61F 13/01* (2024.01)
*A61F 13/00* (2024.01)

(52) U.S. Cl.
CPC .. *A61F 13/01029* (2024.01); *A61F 13/00059* (2013.01); *A61F 13/01038* (2024.01); *A61F 2013/00123* (2013.01)

(58) Field of Classification Search
CPC .......... A61F 13/00029; A61F 13/00017; A61F 13/00059; A61F 13/010129; A61F 13/01038; A61F 2013/00123
See application file for complete search history.

(56) References Cited

U.S. PATENT DOCUMENTS

| 3,920,499 | A |   | 11/1975 | Day et al. |
| 3,959,555 | A | * | 5/1976  | Day ........................ D06P 5/009 |
|           |   |   |         | 428/354 |
| 4,316,457 | A | * | 2/1982  | Liegeois ................. A61L 15/12 |
|           |   |   |         | 427/179 |
| 4,727,868 | A | * | 3/1988  | Szycher .............. A61F 13/0206 |
|           |   |   |         | 66/193 |

(Continued)

FOREIGN PATENT DOCUMENTS

| CA | 2486683 A1 | 11/2003 |
| DE | 2043692 A1 | 4/1971 |

(Continued)

OTHER PUBLICATIONS

International Search Report and Written Opinion from PCT/EP2019/080464 dated Jan. 29, 2020.
German Search Report dated Jul. 29, 2019.

*Primary Examiner* — Rachael E Bredefeld
*Assistant Examiner* — Seth R. Brown
(74) *Attorney, Agent, or Firm* — LEYDIG, VOIT & MAYER, LTD.

(57) ABSTRACT

The invention relates to a bandage for use on the human or animal body, the bandage comprising a fiber-containing material. At least one longitudinal end of said material is provided with a neatened edge and additionally has a zone that contains an information element. The invention further relates to a method for producing a bandage of the above type.

24 Claims, 4 Drawing Sheets

(56) References Cited

U.S. PATENT DOCUMENTS

| | | | | |
|---|---|---|---|---|
| 6,049,022 A | * | 4/2000 | Tseng | A63B 71/14 |
| | | | | 602/41 |
| 2004/0082897 A1 | * | 4/2004 | Rangel | A61L 15/58 |
| | | | | 602/59 |
| 2004/0170813 A1 | * | 9/2004 | Digiacomantonio | B32B 5/022 |
| | | | | 604/385.01 |
| 2004/0249328 A1 | * | 12/2004 | Linnane | A61F 13/0203 |
| | | | | 602/43 |
| 2011/0183712 A1 | * | 7/2011 | Eckstein | G06Q 30/016 |
| | | | | 602/44 |
| 2014/0107544 A1 | * | 4/2014 | Jung | A61F 13/06 |
| | | | | 601/84 |
| 2016/0166437 A1 | * | 6/2016 | Lundh | D04B 21/18 |
| | | | | 602/76 |
| 2016/0193086 A1 | * | 7/2016 | Castle | A61F 13/00987 |
| | | | | 156/247 |
| 2016/0242964 A1 | * | 8/2016 | Rapp | A61F 13/00063 |
| 2017/0173854 A1 | * | 6/2017 | Bokern | B29C 61/003 |
| 2018/0078423 A1 | * | 3/2018 | Magin | A61L 15/64 |
| 2019/0262186 A1 | | 8/2019 | Rapp et al. | |

FOREIGN PATENT DOCUMENTS

| | | | | |
|---|---|---|---|---|
| DE | 8307204 U1 | 6/1983 | | |
| DE | 102008003122 A1 | 7/2009 | | |
| DE | 102011076596 A1 | 11/2012 | | |
| EP | 2175398 A1 | 4/2010 | | |
| WO | 03098543 A1 | 11/2003 | | |
| WO | WO-2015007335 A1 | * | 1/2015 | ....... A61F 13/00012 |

\* cited by examiner

BANDAGE IMPRINT

The present invention relates to a bandage for placing on the human or animal body, wherein the bandage comprises a fiber-containing material which is equipped with a cut-edge fixing means at least at one longitudinal end and additionally has a region which contains an information element. The invention also relates to a method for producing a bandage of this type.

Bandages which are used for therapeutic, prophylactic or cosmetic purposes, such as for example compression bandages, supportive bandages or fixing bandages, usually comprise a material which contains fibers of materials obtained by natural or synthetic means. Bandages of this type are generally produced as an effectively continuous bandage band in a first work step and then cut to the desired length. In the process, the resulting cut edges constitute regions from which fibers protrude and can become detached. This can lead to adverse effects on the treatment of a human or animal body part or to damage through to destruction of the bandage. This problem occurs particularly with bandages which are used repeatedly and are subjected to a cleaning process between the individual uses. It is customary to fix the cut edges by taking them in, by applying a sticky periphery or by applying a plastic layer.

It is common to bandages of this type that, in a usage situation, they are removed from a packaging which can contain technical or user-related information in the form of a pack insert or in summary on the packaging itself, in order then to be used in particular on the human or animal body without continued provision of a pack insert or packaging.

Furthermore, this constitutes a problem in that technical information or user-related information cannot be applied to most medical products of this type, either for reasons of dimensions or space or for other reasons caused by the use of the products.

Nevertheless, at a later point in time, in particular also during or after use, it can be of interest or necessary to obtain information especially relating to application instructions or complications with the application.

It is also desired or obligatory to be able to identify the products unambiguously from a variety of perspectives, for example from perspectives of the distributing companies, the registration authorities or from perspectives of the users. In this way, safe identification of the product should also be possible when packaging inserts and other accompanying information is not present. This cannot always be ensured by the form, size and appearance of the product alone.

A method for providing the tamperproof identification of products, wherein for this purpose it is intended to provide an individual encrypted identifier and an unencrypted identifier, wherein the encrypted identifier corresponds to the unencrypted identifier when said encrypted identifier is decrypted by means of the public key, is previously known from WO 03/098543 A1. In this respect, the identifier is created with a secret part of the key, with the result that, when the two identifiers match after decryption of the encrypted part, it is ensured that the encrypted part was created with the secret part of the key and that therefore the manufacturer of the original has created the encrypted part and it is therefore an original product.

EP2175398 also discloses providing a medical product, for example a bandage, with a QR code.

US2016/193086 discloses providing bandages with a variety of symbols, for example with codes, which allow access to further information.

It is an object of the invention to provide a bandage which comprises fixing of the cut edges and which provides a user with further information relating to the bandage in a simple manner, even when further accompanying information, such as pack inserts, is no longer present. At the same time, in this respect, the intention is to ensure that the information provided relates specifically to the respective product. Finally, the intention is to achieve the fixing of cut edges and provision of further information in a manner which is favorable in economic and production terms.

Said object is achieved by the subject matter of claim 1.

A bandage according to the invention comprises a sheet-like band material having a longitudinal direction and a transverse direction as well as two transverse edges which are situated opposite in the longitudinal direction and two longitudinal edges which are situated opposite in the transverse direction. The bandage can be wound up to form a roll.

A bandage according to the invention comprises a fiber-containing material. These fibers can be both fibers obtained from a natural source and fibers produced by synthetic means. Preferred materials comprise fibers of cotton, cellulose, viscose, cellulose derivatives, polyethylene, polypropylene, polyamide, polyester, derivatives of the materials mentioned, or mixtures thereof. A bandage according to the invention can comprise, for example, a woven fabric, a knitted fabric, a crocheted fabric or a nonwoven.

Bandages are generally produced in a first step as a bandage band in an effectively continuous form and then cut to the desired dimensions. In the process, a cut edge is formed in each case at the transverse edges situated opposite in the longitudinal direction. Here, at each cut edge, the bandage has a first region which contains loose fibers that protrude out of the band-shaped bandage material and can become detached. The first region can have a width of from 6 mm to 20 mm. If these cut edges are not fixed, detached fibers can lead to the bandage being damaged to the point of destruction. This process is intensified in particular by cleaning processes such as washing or sterilization operations which, in the case of bandages which can be used repeatedly, have to take place between the individual uses. Furthermore, detached fibers can come into contact with the skin of the living being on which the bandage is placed. This can lead to the wearing comfort being adversely affected or to discomfort such as skin irritation or contamination of the areas to be treated.

In principle, a variety of methods can be used to fix cut edges. By way of example, the cut edges can be sewn up or provided with a sticky periphery, which should prevent fibers from detaching. In the present invention, fixing of the cut edges is achieved in that, in a method known as heat transfer printing, a layer of a thermoplastic material is applied to the bandage in the region of the at the transverse edge lying in the longitudinal direction (L) and is introduced into the material by the action of heat and pressure.

For the purpose of printing a textile material in a method referred to as heat transfer printing, a material, also referred to as heat transfer, which has been applied to a carrier is placed onto the textile material to be printed. The material referred to as heat transfer is preferably applied to a carrier which can be provided with a separating layer. A layer of a thermoplastic material is applied on top of this. A variety of further layers can be arranged between the carrier layer and the layer of a thermoplastic material. A heated pressing punch presses the heat transfer located on a carrier onto the surface of the textile to be printed, with the result that the layer of a thermoplastic material comes directly into contact with the surface of the textile material to be printed. In the process, the thermoplastic material is heated to a temperature above its softening point. The softened thermoplastic material is pressed into the textile material by virtue of the pressure applied by the pressing punch, and therefore the fibers incorporated in the textile material are at least partially encapsulated in thermoplastic material or the interspaces of said fibers are at least partially filled with thermoplastic material. After a certain time period, referred to as contact time, the heated pressing punch releases its pressure. Finally, the carrier layer is removed. The heat transfer is now fixed in the textile material or to the surface thereof. Further layers can be arranged between the carrier layer and the thermoplastic layer. Heat transfers of this type can be produced conveniently, for example in a screen printing process, in which a separating layer, optionally one or more varnish layers, optionally one or more color layers, optionally one or more further layers and finally at least one layer of a thermoplastic material are applied one after another to a carrier layer.

A thermoplastic material is understood to mean a material which is plastically deformable in a certain temperature range, while it does not have any plastic properties at a lower temperature. A thermoplastic material also has the property that the transition from the non-plastic to the plastic state can be reversed by heating. That is to say, when being cooled to a temperature below the temperature range in which the material is plastically deformable, the material returns to a state in which it is not plastically deformable. In the ideal case, the operation can be repeated as often as desired by repeated heating and cooling.

In the context of the present invention, a thermoplastic material is understood to mean a material which is plastically deformable at a temperature between 60° C. and 300° C., while it is not plastically deformable at a temperature below 60° C. It is preferably a material which is plastically deformable at a temperature between 80° C. and 200° C., while it is not plastically deformable at a temperature below 80° C. It is particularly preferably a material which is plastically deformable at a temperature between 100° C. and 150° C., while it is not plastically deformable at a temperature below 100° C. A material of this type can advantageously be used in the case of bandages which are used repeatedly and are washed at a temperature of up to 95° C. between two uses. It is very particularly preferably a material which is plastically deformable at a temperature between 122° C. and 130° C., while it is not plastically deformable at a temperature of less than 122° C. A material of this type can advantageously be used in a bandage which is used repeatedly and is subjected to a vapor sterilization process at 121° C. between two uses. Suitable thermoplastic materials can comprise polymers based on polyolefin such as for example polyethylene or polypropylene, acrylonitrile butadiene styrene, polyamide, polylactate, polyacrylate such as for example polymethyl methacrylate, polycarbonate, polyester such as for example polyethylene terephthalate, polystyrene, polyether ether ketone, polyvinyl chloride, polyurethane, copolymers of these materials, or mixtures thereof. It is particularly preferable if a material is used which is a mixture of a single-component polyester polyurethane based on an aromatic diisocyanate with pulverized copolyamide, which has a melting point of 128° C.

The layer of a thermoplastic material becomes plastically deformable by heating the multilayered material. By applying pressure, the now plastically deformable material can be applied to the bandage such that the thermoplastic material penetrates into the material of the bandage. As a result, what is formed is a region in which the bandage has a layer containing fibers which are covered at least partially with a thermoplastic material mentioned or the interspaces of which are filled at least partially with a thermoplastic material. What is understood by a fiber covered with a thermoplastic material is a fiber the surface of which is covered along at least part of its length over its entire circumference or part thereof by thermoplastic material. After subsequent cooling, the thermoplastic material returns to a non-plastic state. In this way, fibers of the bandage are fixed in the bandage by the thermoplastic material, and therefore detaching of the fibers from the material of the bandage is prevented.

If a method of this type is used for fixing ends or cut edges, a bandage produced in this way has the advantage that it can be produced with little mechanical outlay in a considerably shorter time in comparison with bandages the ends or cut edges of which have been produced in one of the methods mentioned of sewing up or gluing. Furthermore, a fixing of the ends in this way exhibits a high strength with respect to mechanical, thermal, other physical or chemical stress, as occurs for example in a washing operation or in a sterilization process. A fixing of the ends in this way withstands up to 50 washing operations at a washing temperature up to 95° C. and chemical cleaning with tetrachloroethylene/perchloroethylene. Said fixing of the ends can be ironed over up to approx. 130° C. The fixing of the ends exhibits a light fastness and weather resistance of up to 2000 h and exhibits an abrasion resistance in accordance with DIN ISO 53754.

A bandage according to the invention has a second region in which the bandage has a first layer containing fibers which are covered at least partially with a thermoplastic material mentioned or the interspaces of which are impregnated at least partially with a thermoplastic material. This second region has a second layer which consists of a non-thermoplastic material. This second region can have further additional layers. In one preferred embodiment, the first and the second region are connected to one another.

In one preferred embodiment, the second layer of a non-thermoplastic material is a varnish layer. A varnish layer of this type protects the underlying color layer from mechanical, thermal, other physical or chemical stress. In particular, the effect of this varnish layer is to resist moisture, temperature, dirt, mechanical action, detergents, radioactive radiation such as alpha, beta or gamma radiation, or chemical influences such as for example resistance to ethylene oxide.

A bandage according to the invention additionally has, in said second region, an information element which is arranged in the second layer. In the context of the present invention, an information element is understood to mean an element which is configured or equipped such that it conveys information to an observer. This information can be understood directly or procure access to a further source of information.

Information which can be understood directly is for example texts or symbols in the form of graphical representations. These texts or symbols can for example contain specific statements relating to the manufacturer, the product identity, decorative elements, use instructions or warnings. They can, however, also contain abstract representations which become significant only in interaction with further factors. It is thus possible, for example, for a symbol to be represented such that its visual appearance can be different depending on external circumstances. A symbol can, for example, serve as an indicator for the extent of the stretching in the case of a stretchable bandage, from which indicator the user obtains information about the state of application of the bandage.

Information which procures access to a further source of information is, for example, a code, which can be understood by the user directly or by means of a reading unit or can be used in another way.

In principle, today a multiplicity of codes are known, in particular barcodes, codes of this type representing an opto-electronically readable document which consists of a variety of lines or elements and gaps. The terms "code" and "coding" are used synonymously here. These codes can be read and further processed by optical readers, such as e.g. bar-code readers (scanners) or CCD cameras, but also mobile phones and PDAs. They can be applied by conventional printing processes, such as offset, flexographic or gravure printing, or else by laser printing, direct thermal printing, thermal transfer printing or inkjet printing. A distinction is made here from barcodes the code of which is applied only in one axis, i.e. one-dimensional codes. In addition, two-dimensional codes are used, in which the code is applied in two axes. These codes can consist of stacked one-dimensional codes which are arranged in lines or in actual area codes. Finally, what are known as 3D codes also exist, in which for example the color tone, the color saturation or the color brightness represents the third dimension. Here, all two-dimensional codes also code information perpendicular to the main alignment.

In this respect, a distinction is made between the actual area or matrix codes, or else referred to as actual array codes, and the stacked codes. In the case of the matrix codes, the data are uniformly coded within a matrix composed of blocks. In the case of actual matrix codes, the alignment plays practically no role, and therefore they can be read omnidirectionally. In particular in the case of medical products, such as for example bandages, this has the advantage that reading by a user is simplified and directional indications which enable reading do not have to be attached to the product. This omnidirectional readability is advantageous in all products which do not include any predefined alignment inherent to the product.

In this respect, it is particularly preferred that the two-dimensional matrix code is a QR code. QR codes can be very small and have an almost unlimited service life. The data in the QR code are present redundantly. Depending on the configuration, the data can still be decrypted even when up to 30% of the code is destroyed.

The use of QR codes is advantageous in that nowadays, already many mobile phones or PDAs (Personal Digital Assistants) with an installed camera have software which makes it possible to read QR codes. For many other devices, such software can be obtained. According to the invention, an Internet or web address is now coded by the code. Since nowadays most mobile phones or PDAs contain a web browser in addition to a camera, the code can be read e.g. by the mobile phone and is conveyed by the software automatically to the correspondingly encrypted Internet site. The specific information relevant to the product can then be taken directly from this Internet site, it being possible to avoid searching for the homepage of the manufacturer or optionally even widely on the Internet in order to firstly obtain the manufacturer data.

In addition, further information can also be incorporated in the coding. This further information is then contained in a second two-dimensional matrix code. By way of example, it is possible for the uniform resource locator (URL) of the Internet site, which contains the use-specific and/or technical data relating to the medical product, to be specified by the first two-dimensional matrix code and for a telephone number, which establishes a direct connection to an information center for the medical product, to be specified by a second two-dimensional matrix code. This telephone number can then be further processed directly in the mobile phone or in the PDA and thus also optionally enable contact to be made with a hotline or the like. This is advantageous for obtaining further information e.g. with respect to undesired effects such as therapeutic complications of the product even when for certain reasons connection to the Internet site encrypted in the coding cannot be established or it is perceived as being too uncomfortable to read the data, for example on the display of a mobile phone, or a direct conversation with an advisor is desired. According to a further concept of the present invention, a medical product is thus also the subject of the present invention, said medical product comprising at least two two-dimensional matrix codes, in particular two QR codes, wherein the first matrix code specifies a uniform resource locator of an Internet site containing use-specific and/or technical data relating to the medical product and the second matrix code specifies a telephone number which establishes a direct connection to an information point for the medical product.

Instead of a QR code, what are known as data matrix codes, MaxiCodes, Aztec codes or dot codes/point codes can, however, also be used as coding.

In this respect, the QR code offers the advantage that the software for decrypting the code is nowadays commonplace and in particular can be freely obtained, and therefore access to the relevant data is possible for virtually any user.

Provision can also be made here that the quick-response code, or QR code, which is quadratic and comprises three search aids which can easily be seen in three corners as light and dark squares nested inside one another, comprises symbol elements which are configured as squares. According to the invention, 21×21 to inclusively 75×75 squares, in particular 21×21 to inclusively 53×53 squares, and in particular 21×21 squares to inclusively 45×45 squares can be provided.

The code can in particular have a surface area of at least 0.5 $cm^2$ and at most 20 $cm^2$. In this way, it can be attached without destroying the usability and visual appearance of the bandage, and can still likewise be readily found and seen by the user and handler. In particular, the size of the code can be between 1 $cm^2$ and 15 $cm^2$ and very preferably between 1 $cm^2$ and 9 $cm^2$.

Provision can be made in this respect that one of the error correction levels is used to permit reconstruction of a damaged code of 7% up to 30%. That is to say, it is possible for up to 7% or even up to 30% of the code to no longer be readable and nevertheless the information can be taken from the code.

In an alternative embodiment, the information element is a layer which comprises a substance able to be modified or destroyed in a physical, in particular a mechanical, thermal or optical process, or a chemical process. In a process of this type, the material is changed from a first base state to a second end state. In this respect, the properties of the material in the base state must be able to be identified as different from the properties of the material in the end state by sensory perception or physical or chemical investigation. The layer preferably has at least two plies, the first and second plies of which have different colors exhibiting a color contrast with respect to one another that is strong enough for the human eye to be able to easily perceive them as different.

The top color layer can be destroyed for example by a laser such that the underlying color layer can be seen.

In a refinement of this embodiment, the information element can have a further layer consisting of a substance which is not destroyed in the same physical or chemical process.

The destructibility of the incorporated materials allows the possibility of providing the information element with the desired information only after production of the bandage according to the invention. It is possible that it is desired, for example, to provide individual bandages with successive numbers for coding the serial number, a batch number, use-by date, production date during the industrial production of bandages according to the invention. It is also possible that it is desired to provide a bandage according to the invention which can be used repeatedly with indications, documenting the use, cleaning or sterilization carried out, during the entire use period.

Suitable processes for equipping the information element with the desired information after production of a bandage according to the invention comprise mechanical, chemical, thermal or optical processes. By way of example, the desired information can be introduced into the first layer by scraping, etching, chemical modification, light or heat. The first layer preferably comprises a dye which can be destroyed by a laser pulse, the color of said first layer changing in the process.

In an alternative embodiment, the information element is a system known to experts as radio-frequency identification, RFID for short. RFID can be construed as "identification using electromagnetic waves" and designates a technology for transmitter/receiver systems for automatically and contactlessly identifying and locating objects by means of radio waves.

An RFID system consists of a transponder (also commonly known as a radio tag), which is located on or in the object and contains an identifying code, and also a reader for reading this identifier.

RFID transponders can nowadays be produced for example by a special printing process for printing stable circuits composed of polymers. RFID transponders produced in this way have a small size, unobtrusive readability and a low price.

The reader is capable of generating alternating magnetic fields at a short range or high-frequency radio waves, which are used for coupling RFID transponders and RFID readers. In this way, it is the case not only that data are transmitted, but also that the transponder is supplied with energy.

The reader contains software which controls the actual reading process and RFID middleware with interfaces to further EDP systems and databases.

The structure of an RFID transponder fundamentally provides an antenna, an analog circuit for receiving and transmitting (transceiver), and also a digital circuit and a permanent memory.

RFID transponders have a memory which can be written at least once and contains its unmodifiable identity. If a plurality of writable memories are used, further information can be stored during the service life, for example about the use, cleaning operations and sterilization operations already carried out.

Provision is particularly preferably made for the use-specific and/or technical information to be the reproduction of the content of the packing enclosure, of the pack insert or the use instructions according to medical product guidelines of the bandage. In this way, it can be ensured that, even after the actual bandage has been separated from the packing enclosure and/or the pack insert or the use instructions, all of the indications incorporated in this information are available to the user at any later point in time, optionally even still after use of the product.

Here, it is particularly preferred that the Internet site reproduces the information or data in the local language in which the product was sold. This information can additionally be introduced into the code as further information so that the user is forwarded directly to the Internet side in the corresponding local language.

A mobile phone or PDA which comprises a device for recording images, in particular a camera, as well as decryption and transmission software for the code can preferably be used as decoder. That is to say, the mobile phone or else, if a PDA is used as decoder, the PDA requires software for reading preferably QR codes of this type and also software with which a connection to the Internet can be established, in particular a web browser.

The invention further comprises the use, on the outer side of a medical product, of an actual matrix code (array code), in particular a quick-response code (QR code), for encrypting a uniform resource locator (URL) of an Internet site providing use-specific information and/or technical data of a medical product. In this respect, the use-specific information, in particular the reproduction of the content of the packing enclosure, of the pack insert or of the use instructions, can be designed in accordance with medical product guidelines for the medical product.

In one particular embodiment, the code can procure access to a video which shows the correct use of the respective bandage on the human or animal body. The code preferably directly procures access to a video in the respective language of the country or the region in which the bandage is sold. Access to a video of this type can be procured by the code firstly procuring access to an Internet site from which the video can then be played back. As an alternative, the code can also directly procure access to a corresponding video without interim access to an Internet site being necessary.

In an alternative embodiment, a bandage according to the invention is a stretchable, preferably elastically stretchable bandage. In this embodiment, the layer containing the information element comprises a material which is stretchable, preferably elastically stretchable. In this respect, the information element constitutes a stretch indicator. The information element can represent a geometric symbol or a microsensor system in this case. In the case of a geometric symbol, preferred symbols are those which change their form in a visually perceptible manner by stretching, with the result that the ideal extent of stretching for placing the bandage can be seen by a user. Preferred symbols are for example ovals, which assume a circular form during ideal stretching, or diamonds and/or rectangles, which assume the form of a square during ideal stretching.

The information element can be integrated in a layer. A layer of this type can consist of a synthetic polymer, which does not have any plastic properties under the pressure and temperature conditions arising during a heat transfer printing process. A layer of this type preferably consists of a polyurethane-based plastic, particularly preferably of a single-component polyester polyurethane based on an aromatic diisocyanate.

In a preferred embodiment, the bandage has a color layer, which is covered completely by a varnish layer, in said second region. In this embodiment, the color layer is applied directly to the layer containing fibers which are covered at least partially with a thermoplastic material mentioned or the interspaces of which are impregnated at least partially with a thermoplastic material. Said varnish layer is located directly on the color layer. A varnish layer of this type protects the underlying color layer from mechanical, thermal, other physical or chemical stress. In particular, the effect of the varnish layer is to resist moisture, temperature, dirt, mechanical action, detergents, radioactive radiation such as alpha, beta or gamma radiation, or chemical influences such as for example resistance to ethylene oxide.

A varnish layer of this type can consist of a synthetic polymer, which does not have any plastic properties in the conditions of the heat transfer printing process. A varnish layer of this type preferably consists of a single-component polyurethane based on an aliphatic diisocyanate.

A varnish layer of this type withstands up to 50 washing operations at a washing temperature up to 95° C. and chemical cleaning with tetrachloroethylene/perchloroethylene. Said varnish layer can be ironed over up to approx. 130° C. The varnish layer ensures a light fastness and weather resistance of up to 2000 h and an abrasion resistance in accordance with DIN ISO 53754.

A further subject matter of the present invention is a method for producing a bandage according to the invention. In this respect, the method comprises the following steps:
a) providing a bandage band composed of a fiber-containing material,
b) providing a first material composed of at least two layers, the first layer of which consists of a thermoplastic material and the second layer of which consists of a non-thermoplastic material,
c) providing a second material composed of at least two layers, the first layer of which consists of a thermoplastic material and the second layer of which consists of a non-thermoplastic material,
d) applying the mentioned first material to a first region,
e) applying the mentioned second material to a second region,
f) exposing the first and the second region to a pressure of at least 1.5 bar and a temperature of 60-300° C.,
g) transporting the bandage band to a measuring, winding and cutting-to-length device,
h) severing the bandage band within the first region from one longitudinal edge to the other longitudinal edge.

In a preferred method, the first and the second material are provided on a carrier web which contains both the first and the second material in an alternating sequence. The carrier web consists of a paper coated on one side with a wax base. Here, the wax layer is deposited uniformly on the paper and has a thickness of 9 g/m²+/−1 g/m². The paper preferably consists of a paper pulp bleached without chlorine (TCF or ECF methods). As an alternative, the carrier web consists of a transparent polyester film with a separating layer, the thickness of the film amounting to 117-133 μm.

Particular significance is afforded in this respect to the parameters in step f). Here, it must be ensured that the thermoplastic material is heated to a temperature at which it is plastically deformable within the time period in which it is exposed to pressure and temperature. This time period is referred to as contact time. At the same time, the pressure must be selected such that the thermoplastic material in its plastically deformable state can cover the fibers of the bandage material and can penetrate into the interspaces of the fibers. The lower the viscosity of the plastically deformable material is, the lower the pressure necessary for the thermoplastic material in its plastically deformable state to be able to cover the fibers of the bandage material and to be able to penetrate into the interspaces of the fibers. It is desirable here to keep the contact time as short as possible in order to be able to work economically in terms of the process. In this respect, a contact time of less than 10 s is preferred, in particular a contact time of less than 4 s is envisaged. In order to achieve this target, the thermoplastic and non-thermoplastic materials used and the process parameters have to be selected carefully.

The method is preferably carried out at a temperature of 150° C. to 250° C. in step f). This presupposes that, in step b), a first material is provided which is composed of at least two layers, the first layer of which consists of a material which is plastically deformable at a temperature of 150-250° C. and the second layer of which consists of a material which is not plastically deformable at a temperature of less than 150° C., and that, in step c), a second material is provided which is composed of at least two layers, the first layer of which consists of a material which is plastically deformable at a temperature of 150-250° C. and the second layer of which consists of a material which is not plastically deformable at a temperature of less than 150° C.

The method is particularly preferably carried out at a temperature of 178° C. to 220° C. in step f). This presupposes that, in step b), a first material is provided which is composed of at least two layers, the first layer of which consists of a material which is plastically deformable at a temperature of 178-220° C. and the second layer of which consists of a material which is not plastically deformable at a temperature of less than 178° C., and that, in step c), a second material is provided which is composed of at least two layers, the first layer of which consists of a material which is plastically deformable at a temperature of 178-220° C. and the second layer of which consists of a material which is not plastically deformable at a temperature of less than 178° C.

The method is further preferably carried out such that the steps d), e) and f) encompass a time period of less than 10 s, particularly preferably of 1.5 s to 4.0 s.

The method is further preferably carried out such that, in step f), a pressure of 4 bar to 6 bar is applied.

It has surprisingly been found that, when using a single-component polyester polyurethane based on an aromatic diisocyanate with pulverized copolyamide, which has a melting point of 128° C., as thermoplastic material at a temperature of 178° C. and a pressure of 4 bar to 6 bar, a contact time of at most 4 s, preferably 1.5 s to 4 s, is sufficient.

Specific configurations of the present invention are illustrated in more detail below on the basis of FIGS. 1 to 6.

FIG. 1 schematically shows a bandage according to the invention, in which the information element contains a QR code.

FIG. 2 schematically shows a bandage according to the invention, in which the information element contains an RFID transponder.

FIG. 3 schematically shows a bandage according to the invention, in which the information element contains a geometric symbol as stretch indicator.

FIG. 4 schematically shows a method for producing a bandage according to the invention.

Figure 1:
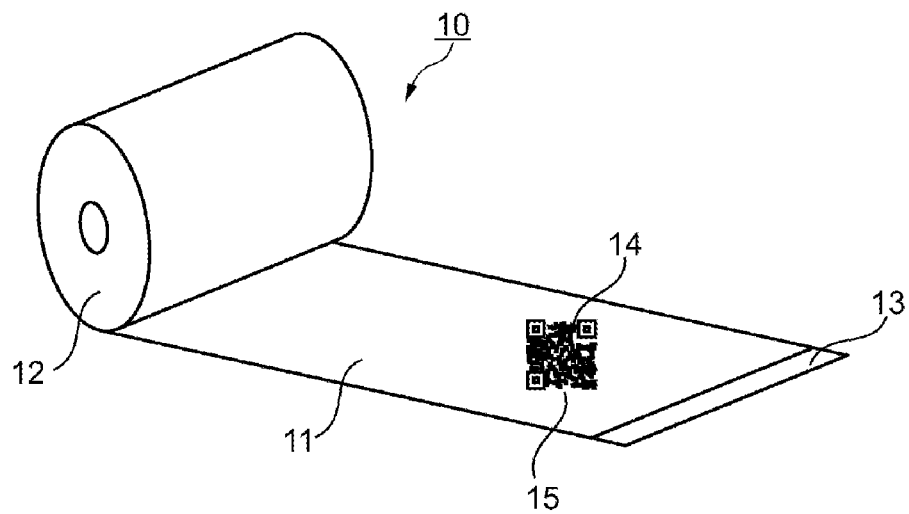

FIG. 1 shows a bandage (10) according to the invention which is wound up on a roll (12). The bandage comprises a fiber-containing bandage material (11). Present on the outer end of the bandage is a region (13) which comprises a cut-edge fixing means. This region (13) contains fibers which are covered at least partially with a thermoplastic material or the interspaces of which are impregnated with a thermoplastic material. The bandage (10) has a second region (15) different from the first region of the cut edge (13). Said second region comprises a first and a second layer. The first layer contains fibers which are covered at least partially with thermoplastic material or the interspaces of which are impregnated with a thermoplastic material. The second layer comprises a non-thermoplastic material and contains an information element in the form of a QR code (14).

Figure 2:
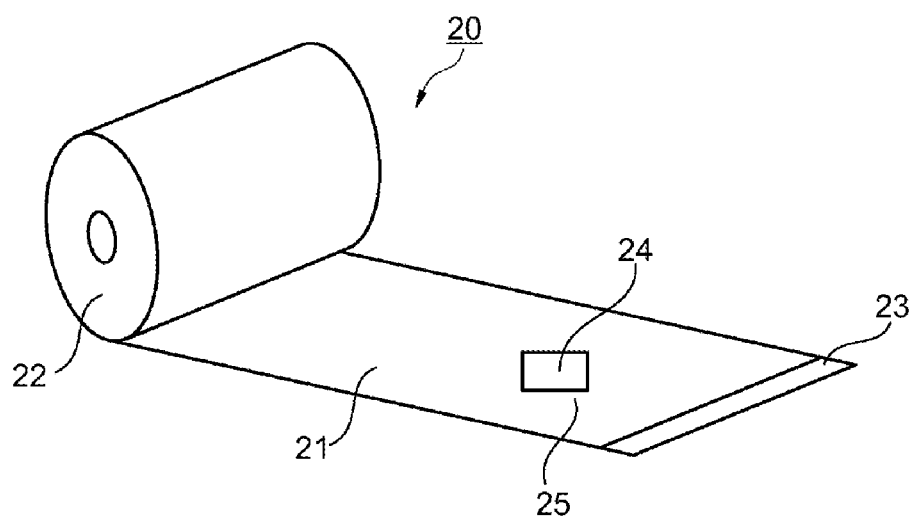

FIG. 2 shows a bandage (20) according to the invention, which is wound up on a roll (22). The bandage comprises a fiber-containing bandage material (21). Present on the outer edge of the bandage is a region (23) which comprises a cut-edge fixing means. This region (23) contains fibers which are covered at least partially with a thermoplastic material or the interspaces of which are impregnated with a thermoplastic material. The bandage (20) has a second region (25) different from the first region of the cut edge (23). Said second region comprises a first and a second layer. The first layer contains fibers which are covered at least partially with thermoplastic material or the interspaces of which are impregnated with a thermoplastic material. The second layer comprises a non-thermoplastic material and contains an information element in the form of an RFID transponder (24).

Figure 3:
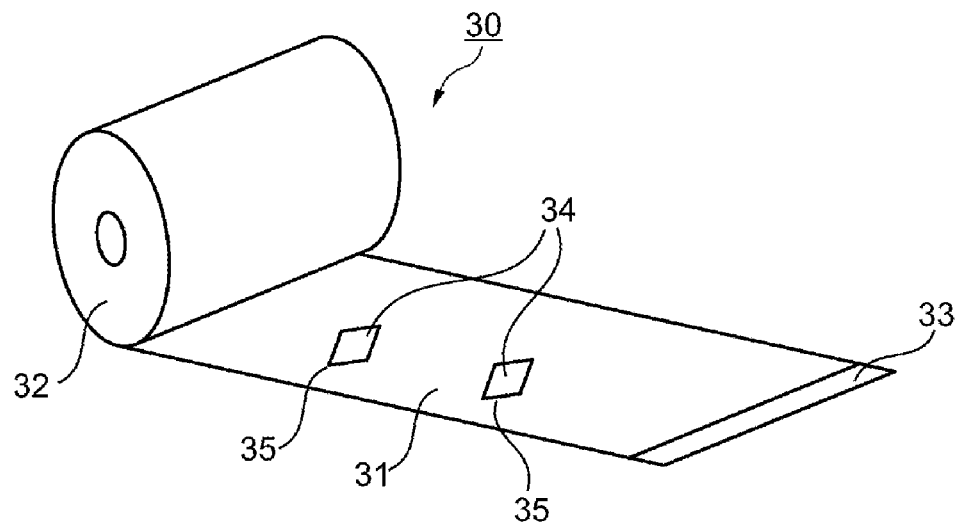

FIG. 3 shows a bandage (30) according to the invention which is wound up on a roll (32). The bandage comprises a fiber-containing bandage material (31). Present on the outer end of the bandage is a region (33) which comprises a cut-edge fixing means. This region (33) contains fibers which are covered at least partially with a thermoplastic material or the interspaces of which are impregnated with a thermoplastic material. The bandage (30) has a plurality of second regions (35) different from the first region of the cut edge (33). Said second regions comprise a first and a second layer. The first layer contains fibers which are covered at least partially with thermoplastic material or the interspaces of which are impregnated with a thermoplastic material. The second layer comprises a non-thermoplastic material and contains an information element in the form of a geometric symbol in the form of a diamond (34). The diamond is configured such that it is pulled during stretching of the bandage (30) and assumes the form of a square during ideal stretching.

Figure 4:
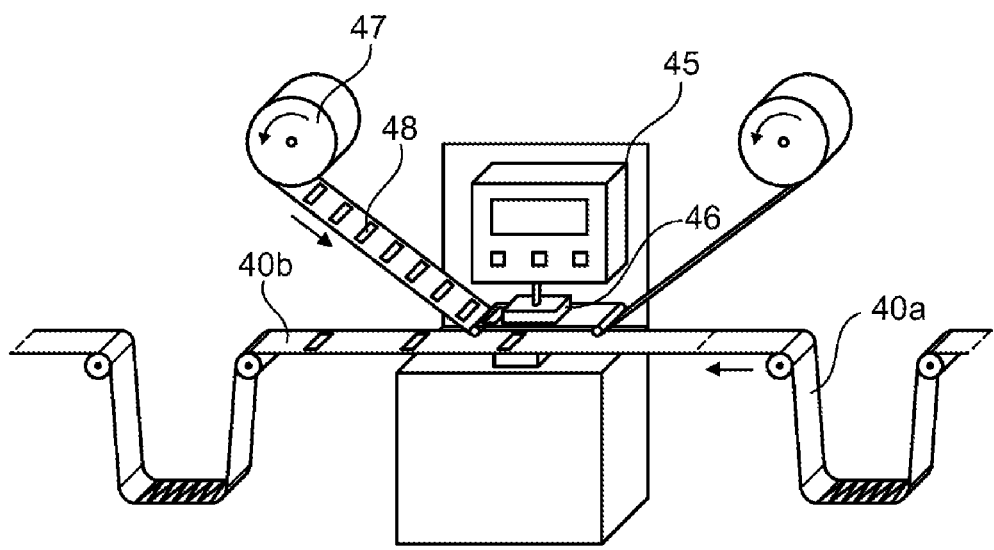

FIG. 4 schematically shows a method according to the invention for producing a bandage according to the invention. A bandage band (40a) composed of a fiber-containing material is conducted to a printing unit (45). The printing unit (45) has a heated pressing punch (46) and is loaded with a roll of a carrier material (47), on which roll a multilayer material (48) referred to as heat transfer is deposited in a repeating sequence. The heated pressing punch (46) presses the carrier material (47) onto the bandage band (40a) such that a layer of the heat transfer (48) composed of a thermoplastic material comes directly into contact with the surface of the bandage band (40a). By virtue of the temperature present in the pressing punch (46) and the applied pressure, the thermoplastic material of the heat transfer (48) is brought into a plastically deformable state and delivered into the material of the bandage band (40a) such that fibers of the bandage band (40a) are covered at least partially with thermoplastic material or the interspaces of which are impregnated with thermoplastic material. The now printed bandage band (40b) is conducted to a measuring, winding and cutting-to-length device (not shown).

Figure 5:
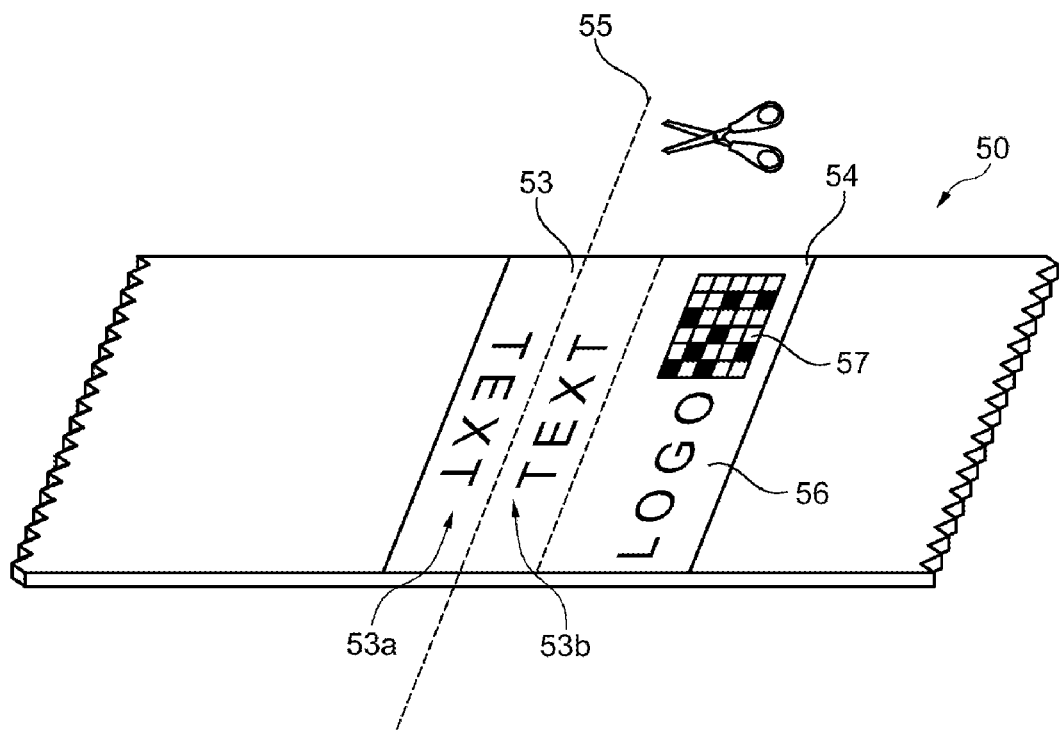
FIG. 5 shows a portion of an intermediate product produced by a method according to the invention.

FIG. 5 shows a detail of a bandage (50) according to the invention which has a first region (53) and a second region (54). The first region (53) is severed in a cutting-to-length device (not shown) along a cutting line (55) from the one longitudinal side to the other longitudinal side, such that subsequently the first region (53) encompasses a first partial region (53a), which constitutes an end fixing means at the end of the bandage, and a second partial region (53b), which constitutes an end fixing means at the start of the bandage. In the present case, both the first and the second partial region (53a, 53b) contain an inscription which is applied to a layer containing fibers which are covered at least partially by a thermoplastic material or the interspaces of which are impregnated at least partially with a thermoplastic material. On the top side of the inscription, the entire first region (53) contains a layer of a varnish composed of a single-component polyurethane based on an aliphatic diisocyanate. The detail has a second region (54) which contains an information element in the form of a graphic illustration (56) and a QR code (57). The second region (54) contains a layer with fibers which are covered at least partially by a thermoplastic material or the interspaces of which are impregnated at least partially with a thermoplastic material. Arranged directly on this layer is a color layer which contains both a graphic illustration (56) and a QR code (57). This layer contains dyes and a single-component polyester polyurethane based on an aromatic diisocyanate. On the top side of this layer, the entire second region (54) contains a layer of a varnish composed of a single-component polyurethane based on an aliphatic diisocyanate.

Figure 6:
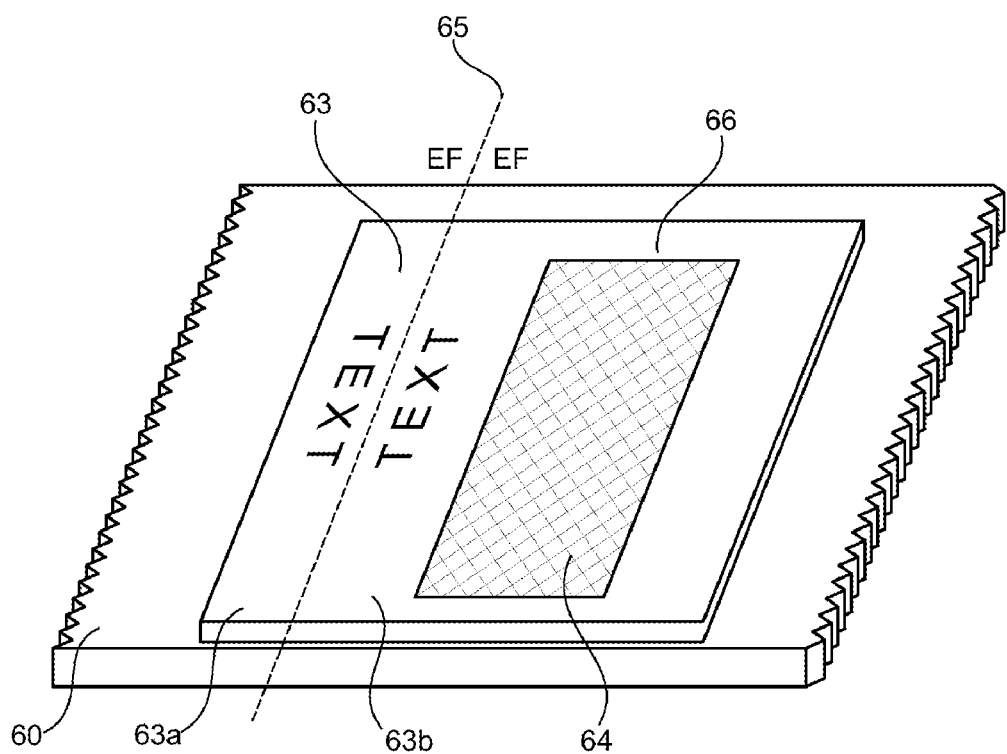
FIG. 6 shows a portion of a further intermediate product produced by a method according to the invention.

FIG. 6 shows a detail of a bandage (60) according to the invention which has a first region (63) and a second region (64). The first region (63) is severed in a cutting-to-length device (not shown) along a cutting line (65) from the one longitudinal side to the other longitudinal side, such that subsequently the first region (63) encompasses a first partial region (63a), which constitutes an end fixing means at the end of the bandage, and a second partial region (63b), which constitutes an end fixing means at the start of the bandage. In the present case, both the first and the second partial region (63a, 63b) contain an inscription which is applied to a layer containing fibers which are covered at least partially by a thermoplastic material or the interspaces of which are impregnated at least partially with a thermoplastic material. On the top side of the inscription, the entire first region (63) contains a layer of a varnish composed of a single-component polyurethane based on an aliphatic diisocyanate. The detail has a second region (66) which contains an information element in the form of a white color layer (64), the white dye of which can have a batch number applied to it in a further process step using a laser (not shown).

The invention claimed is:

1. A bandage (10, 20, 30, 50, 60) for placing on the human or animal body, composed of a fiber-containing material comprising a band material having a longitudinal direction and a transverse direction as well as two transverse edges which are situated opposite in the longitudinal direction and two longitudinal edges which are situated opposite in the transverse direction, wherein the bandage (10, 20, 30, 50, 60) has a first region (13, 23, 33, 53, 63) which adjoins a transverse edge lying in the longitudinal direction, and wherein the bandage (10, 20, 30, 50, 60) has a second region (15, 25, 35, 54, 66), the first region (13, 23, 33, 53, 63) has a layer containing fibers which are covered at least partially with a thermoplastic material or the interspaces of which are impregnated at least partially with a thermoplastic material, the second region has a first layer and at least a second layer disposed over the first layer, the second region defining a transverse dimension extending in the transverse direction and terminates at the two longitudinal edges, the first layer comprises fibers which are covered at least partially with a thermoplastic material or the interspaces of which are impregnated at least partially with a thermoplastic material, and the at least a second layer including a varnish layer comprising a non-thermoplastic material and an information element (14, 24, 34, 57, 64), wherein the varnish layer is spaced from the fibers of the first layer and covers the first layer over a major portion of the transverse dimension of the second region, and wherein the thermoplastic material of the first region and the thermoplastic material of the first layer of the second region are both a single-component polyester polyurethane based on an aromatic diisocyanate.

2. The bandage (10, 20, 30, 50, 60) of claim 1, wherein the information element incorporated in the second layer of the second region is a code which specifies a uniform resource locator of an Internet site that contains use-specific information and/or technical data relating to the bandage.

3. The bandage (10, 50) as claimed in claim 2, wherein the code is a two-dimensional matrix code (14, 57).

4. The bandage (10, 20, 30, 50, 60) of claim 1, wherein the fiber-containing material comprises a woven fabric, a knitted fabric, a crocheted fabric or a nonwoven material.

5. The bandage (10, 20, 30, 50, 60) of claim 1, wherein the thermoplastic materials incorporated in the first and in the second region are identical materials.

6. The bandage (10, 20, 30, 50, 60) of claim 1, wherein the first region has a width of from 6 mm to 20 mm.

7. The bandage (10, 20, 30, 50, 60) of claim 1, wherein the second region (15, 25, 35, 54, 66) is connected to the first region (13, 23, 33, 53, 63).

8. A method for producing a bandage as claimed in claim 1, comprising the steps of:
   a) providing a bandage band (40*a*) composed of a fiber-containing material,
   b) providing a first material composed of at least two layers, the first layer of which consists of a thermoplastic material and the second layer of which consists of a non-thermoplastic material,
   c) providing a second material composed of at least two layers, the first layer of which consists of a thermoplastic material and the second layer which completely overlies the first layer and which consists of a non-thermoplastic material, such that the second layer consisting of the non-thermoplastic material is a varnish layer and is spaced from fibers of the fiber-containing material,
   d) applying the mentioned first material to a first region,
   e) applying the mentioned second material to a second region,
   f) exposing the first and the second region to a pressure of at least 1.5 bar and a temperature of 60-300° C.,
   g) transporting the bandage band (40*a*) to a measuring, winding and cutting-to-length device, and
   h) severing the bandage band (40*a*) within the first region from one longitudinal edge to another the other longitudinal edge.

9. The method of claim 8, wherein step f) is carried out at a temperature of from 178° C. to 220° C., a pressure of from 4 bar to 6 bar and a contact time of from 1.5 s to 4 s.

10. The bandage of claim 1, wherein the thermoplastic material is plastically deformable at a temperature between 122° C. and 125° C.

11. The bandage of claim 1, wherein the fibers are covered and/or impregnated with the thermoplastic material, and the second layer is applied in a single step.

12. The bandage of claim 1, wherein the fibers are selected from the group consisting of cotton, cellulose, viscose, polyethylene, polypropylene, polyamide, polyester, derivatives thereof, and mixtures thereof.

13. The bandage of claim 1, wherein said second region consists of said first and second layers.

14. The bandage of claim 1, wherein the information element is a QR code.

15. The bandage of claim 1, wherein the thermoplastic material of the first region and the thermoplastic material of the first layer of the second region each consist of the single-component polyester polyurethane based on an aromatic diisocyanate and pulverized copolyamide.

16. A bandage (10, 20, 30, 50, 60) comprising a first region (13, 23, 33, 53, 63) and a second region (15, 25, 35, 54, 66), the first region (13, 23, 33, 53, 63) having a layer containing fibers which are covered at least partially with a thermoplastic material or the interspaces of which are impregnated at least partially with a thermoplastic material, the second region having a first layer and at least a second layer disposed over the first layer, the first layer containing fibers which are covered at least partially with a thermoplastic material or the interspaces of which are impregnated at least partially with a thermoplastic material, the at least a second layer comprising a color layer having an information element (14, 24, 34, 57, 64) and a third layer comprising a non-thermoplastic material, the thermoplastic material of the first region and the thermoplastic material of the first layer of the second region each comprising a single-component polyester polyurethane based on an aromatic diisocyanate, wherein the third layer comprising the non-thermoplastic material is spaced from the fibers of the first layer and completely covers the color layer and the first layer.

17. A bandage (10, 20, 30, 50, 60) comprising a first region (13, 23, 33, 53, 63) and a second region (15, 25, 35, 54, 66), the first region (13, 23, 33, 53, 63) having a layer containing fibers which are covered at least partially with a thermoplastic material or the interspaces of which are impregnated at least partially with a thermoplastic material, the second region having a first layer and at least a second layer disposed over the first layer, the first layer containing fibers which are covered at least partially with a thermoplastic material or the interspaces of which are impregnated at least partially with a thermoplastic material, the at least a second layer comprising a color layer having an information element (14, 24, 34, 57, 64) and a third layer comprising a non-thermoplastic material, the thermoplastic material of the first region and the thermoplastic material of the first layer of the second region each consisting of a single-component polyester polyurethane based on an aromatic diisocyanate, wherein the third layer comprising the non-thermoplastic material is spaced from the fibers of the first layer and completely covers the color layer and the first layer.

18. The bandage (10, 20, 30, 50, 60) of claim 16, wherein the third layer, made of non-thermoplastic material, is a varnish layer.

19. The bandage (10, 20, 30, 50, 60) of claim 17, wherein the third layer, made of non-thermoplastic material, is a varnish layer.

20. The bandage of claim 1, wherein the varnish layer withstands up to 50 washing operations at a washing temperature of up to 95° C., chemical cleaning with tetrachloroethylene or perchloroethylene, a light fastness and weather resistance of up to 2000 h and an abrasion resistance in accordance with DIN ISO 53754.

21. The bandage (10, 20, 30, 50, 60) of claim 1, wherein the at least a second layer is spaced from the fibers of the first layer over the entire transverse dimension of the second region.

22. The bandage (10, 20, 30, 50, 60) of claim 1, wherein the at least a second layer comprises a color layer and the varnish layer, the varnish layer disposed over the color layer.

23. The bandage (10, 20, 30, 50, 60) of claim 22, wherein the varnish layer covers the entirety of the color layer.

24. The bandage (10, 20, 30, 50, 60) of claim 23, wherein the varnish layer is disposed over the entire second region.

* * * * *